US012571297B2

(12) United States Patent
Fouda et al.

(10) Patent No.: US 12,571,297 B2
(45) Date of Patent: Mar. 10, 2026

(54) DATA-DRIVEN CONSTRAINED MODEL FOR CORROSION INSPECTION TOOLS

(71) Applicant: Halliburton Energy Services, Inc., Houston, TX (US)

(72) Inventors: Ahmed E. Fouda, Houston, TX (US); Junwen Dai, The Woodlands, TX (US); Yunyun Hu, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 162 days.

(21) Appl. No.: 18/097,962

(22) Filed: Jan. 17, 2023

(65) Prior Publication Data

US 2023/0323766 A1      Oct. 12, 2023

Related U.S. Application Data

(60) Provisional application No. 63/329,660, filed on Apr. 11, 2022.

(51) Int. Cl.
 *E21B 47/00* (2012.01)
 *G01V 3/26* (2006.01)
(52) U.S. Cl.
 CPC .............. *E21B 47/006* (2020.05); *G01V 3/26* (2013.01)
(58) Field of Classification Search
 CPC ................................ E21B 47/006; G01V 3/26
 USPC .......................................................... 324/346
 See application file for complete search history.

(56) References Cited

U.S. PATENT DOCUMENTS

| | | | |
|---|---|---|---|
| 5,381,092 A * | 1/1995 | Freedman | G01N 24/081 |
| | | | 324/303 |
| 9,715,034 B2 | 7/2017 | Omeragic et al. | |
| 9,977,144 B2 | 5/2018 | David et al. | |
| 10,989,045 B2 | 4/2021 | Fouda et al. | |
| 2016/0109614 A1 * | 4/2016 | Wu | G01V 3/28 |
| | | | 702/7 |
| 2018/0074220 A1 * | 3/2018 | David | G01V 3/26 |
| 2018/0172872 A1 | 6/2018 | Fouda et al. | |

(Continued)

OTHER PUBLICATIONS

Gowell, MTD Analysis and Reporting, 2022, retrieved from gowellpetro. com on Jan. 6, 2023.

(Continued)

*Primary Examiner* — Alesa Allgood
*Assistant Examiner* — Rahul Maini
(74) *Attorney, Agent, or Firm* — John Wustenberg; C. Tumey Law Group PLLC

(57) ABSTRACT
A method for estimating a thickness for each of a plurality of nested tubulars may utilize disposing an electromagnetic (EM) logging tool in a wellbore. The method may further utilize transmitting an electromagnetic field from the transmitter into one or more tubulars to energize the one or more tubulars with the electromagnetic field thereby producing an eddy, forming a measurement log from the plurality of measurements, and solving a first inverse problem with uniform priors to obtain a first set of estimated tubular parameters. The method may further utilize designing a data-driven prior based on the first set of estimated tubular parameters, solving a second inverse problem with the data-driven prior to obtain a second set of estimated tubular parameters, and using the second set of estimated tubular parameters to make informed decisions on the integrity of the well casings.

19 Claims, 13 Drawing Sheets

(56) References Cited

U.S. PATENT DOCUMENTS

| | | | |
|---|---|---|---|
| 2019/0078430 A1* | 3/2019 | Fouda ..................... E21B 47/08 |
| 2020/0200940 A1 | 6/2020 | Fouda et al. |
| 2020/0271818 A1* | 8/2020 | Fouda ..................... G01V 3/28 |
| 2020/0306528 A1* | 10/2020 | Linden .............. A61N 1/36114 |
| 2020/0378240 A1 | 12/2020 | Fouda et al. |
| 2021/0054731 A1 | 2/2021 | Fouda et al. |
| 2021/0239874 A1* | 8/2021 | Fouda ..................... G01B 7/13 |
| 2021/0254958 A1* | 8/2021 | Omar ..................... G01V 3/28 |
| 2021/0293983 A1* | 9/2021 | Wei ........................ G01V 1/301 |

OTHER PUBLICATIONS

Martin et al., New High-Definition Frequency Tool for Tubing and Multiple Casing Corrosion Detection, Abu Dhabi International Petroleum Exhibition & Conference, SPE-188932-MS, Nov. 13-16, 2017.

Clegg et al., The Final Piece of the Puzzle: 3-D Inversion of Ultra-Deep Azimuthal Resistivity Lwd Data, SPWLA Annual Logging Symposium, Jun. 15, 2019.

Gowell, Well Integrity Log Interpretation, Magnetic Thickness Detector and 56-Arm Multi-Finger Caliper, Appendix B: MTD Tool Specification & Logging MTD, 2015, pp. 32-35, retrieved from bonnettsenergy.com on Jan. 16, 2023.

Arbuzov et al., Multi String Imaging, EMPulse, White Paper, Jun. 2016, www.tgtoil.com accessed Jan. 16, 2023 ("TGT EMpulse tool").

Schlumberger, EM Pipe Scanner Electromagnetic casing inspection tool, brochure retrieved from www.slb.com/eps on Jan, 16, 2023.

Angharad Lock, Halliburton launches electromagnetic pipe inspection tool, Oilfield Technology, Oct. 11, 2017, retrieved from oilfieldtechnology.com on Jan. 16, 2023.

May et al., The Effect of Yield Stress on Fracture Fluid Cleanup, SPE 38619.

Titanium, Cased Hole Wireline Services, Multi-Finger Caliper, retrieved from titaniumes.ca on Jan. 16, 2023.

Gowell, Magnetic Thickness Detector-E (MTD-E) retrieved from wilca.ve.com on Jan. 13, 2023.

International Search Report and Written Opinion for International Patent Application No. PCT/US2023/012524 dated May 31, 2023.

* cited by examiner

STEP FUNCTION $\lambda\, u(t - t_{nom})$

RECTIFIED SIGMOID FUNCTION $\lambda\, S(t - t_{nom})$

RECTIFIED LINEAR FUNCTION $\lambda\, R(t - t_{nom})$

SIGMOID FUNCTION $\lambda\, S(t - t_{nom})$

DATA-DRIVEN CONSTRAINED MODEL FOR CORROSION INSPECTION TOOLS

BACKGROUND

For oil and gas exploration and production, a network of wells, installations and other conduits may be established by connecting sections of metal tubular together. For example, a well installation may be completed, in part, by lowering multiple sections of metal tubular (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal tubulars is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate tubular thickness or other corrosion indicators.

Early detection of metal loss is of great importance to oil and gas wells management. Failure to detect metal loss due to corrosion may result in expensive remedial measures and intervention in production wells. In some cases, the leaks due to severe corrosion may contaminate ground water or cause environmental damages. Electromagnetic (EM) techniques may be utilized to create measurement logs to monitor the condition of one or more tubulars.

For computing the thickness of each tubular through the measurements logs an inversion may be performed. An inversion may minimize the misfit between the measurements at a given depth point and synthetic responses computed using a physical model, however this produces a challenge for the inversion. For example, in the absence of other information, more than one solution can fit the measurements. As a result, the inversion result may produce more than one solution or show non-physical choppiness in the estimated thickness of individual tubulars.

BRIEF DESCRIPTION OF THE DRAWINGS

These drawings illustrate certain aspects of some examples of the present disclosure and should not be used to limit or define the disclosure.

DETAILED DESCRIPTION

Figure 1:
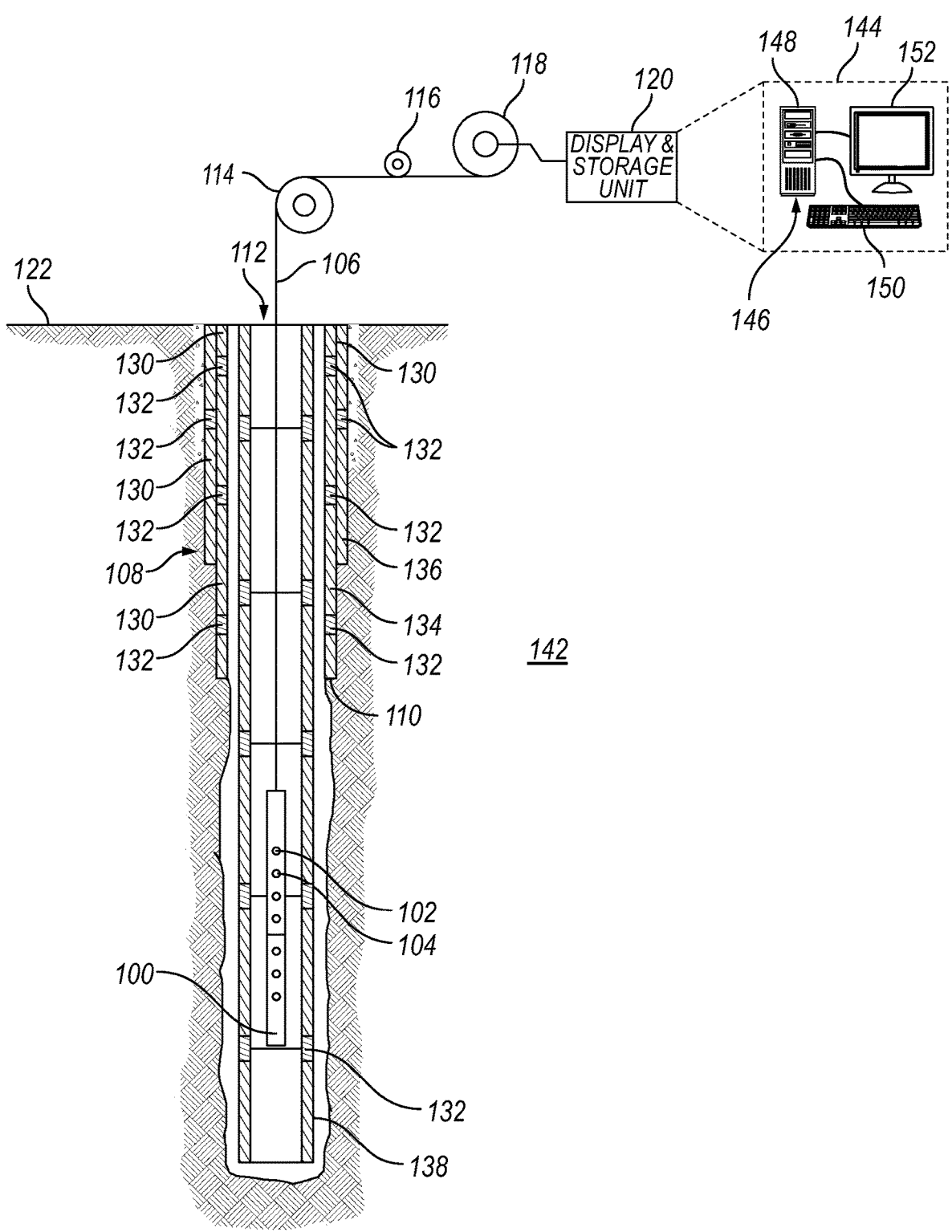
FIG. 1 illustrates an operating environment for an Electromagnetic (EM) logging tool.

This disclosure is directed to methods and systems for subterranean operations and, more particularly, to process measurement logs utilizing Bayes' theorem and combining the information from a prior distribution and a likelihood function. In this application, the prior model is driven from the data itself, and is based on the assessment of the results of a first inversion over a given zone to estimate the direction of defect progression (outside-in versus inside-out) within that zone. This prior information is used to constrain the model of a second inversion to produce a more stable and realistic solution.

In other examples, methods and systems may be utilized to find an optimal regularization parameters of an asymmetric regularization term that aims at minimizing the mirroring (compensation among individual tubular thicknesses) between one or more tubulars in the inversion. This method may take the measurement logs and perform an inversion to find a solution. The method may further provide constraints to the solution to a metal-loss-only model and penalize metal gain, optimize the strength of the regularization term to achieve a balanced solution, while honoring the data, and invert for unknowns using the optimal regularization parameters.

Electromagnetic (EM) sensing may provide continuous in-situ measurements of parameters related to the integrity of tubulars in cased boreholes. As a result, EM sensing may be used in cased borehole monitoring applications. EM logging tools may be configured for multiple concentric one or more tubulars with the first tubular diameter varying (e.g., from about two inches (5 cm) to about seven inches (18 cm)). EM logging tools may measure eddy currents to determine metal loss and use magnetic cores with one or more coils to detect defects in one or more tubulars. The EM logging tools may use pulse eddy current (time-domain) and may employ multiple (long, short, and transversal) coils to evaluate multiple types of defects in one or more tubulars. It should be noted that the techniques utilized in time-domain may be utilized in frequency-domain measurements.

In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques include two broad categories: frequency-domain EC techniques and time-domain EC techniques. In both techniques, one or more transmitters are excited with an excitation signal, and the signals from the one or more tubulars are received and recorded for interpretation. The magnitude of a received signal is typically inversely proportional to the amount of metal that is present in the inspection location. For example, less signal magnitude is typically an indication of more metal, and more signal magnitude is an indication of less metal. This relationship may allow for measurements of metal loss, which typically is due to an anomaly related to a tubular such as corrosion or buckling.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, tubular, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100 in casing string 108.

A typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132.

There may be any number of layers in casing string 108. Such as, a first casing 134 and a second casing 136. It should be noted that there may be any number of casing layers.

FIG. 1 also illustrates a typical tubular string 138, which may be positioned inside of casing string 108 extending part of the distance down wellbore 110. Tubular string 138 may be production tubing, tubing string, casing string, or other tubular disposed within casing string 108. Tubular string 138 may comprise one or more tubulars. It should be noted that one or more tubulars may be connected by collars 132. EM logging tool 100 may be dimensioned so that it may be lowered into the wellbore 110 through tubular string 138, thus avoiding the difficulty and expense associated with pulling tubular string 138 out of wellbore 110.

EM logging tool 100 may include a digital telemetry system which may further include one or more electrical circuits, not illustrated, to supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within EM logging tool 100 and data provided by EM logging tool 100 may be stored within EM logging tool 100, rather than transmitted to the surface to display and storage unit 120 during logging operations. The data may include signals and measurements related to corrosion detection.

During operations, transmitter 102 may broadcast electromagnetic fields into subterranean formation 142. It should be noted that broadcasting electromagnetic fields may also be referred to as transmitting electromagnetic fields. The electromagnetic fields transmitted from transmitter 102 may be referred to as a primary electromagnetic field. The primary electromagnetic fields may produce Eddy currents in casing string 108 and tubular string 138. These Eddy currents, in turn, produce secondary electromagnetic fields that may be sensed and/or measurement by receivers 104. Characterization of casing string 108 and tubular string 138, including determination of tubular attributes, may be performed by measuring and processing primary and secondary electromagnetic fields. Tubular attributes may include, but are not limited to, tubular thickness, tubular conductivity, and/or tubular permeability.

As illustrated, receivers 104 may be positioned on EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by transmitter 102 and the sensing and/or measuring of secondary electromagnetic fields by receivers 104 may be controlled by display and storage unit 120, which may include an information handling system 144. As illustrated, the information handling system 144 may be a component of or be referred to as the display and storage unit 120, or vice-versa. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of one or more tubulars (e.g., casing string 108 and tubular string 138). EC techniques may be particularly suited for characterization of a multi-string arrangement in which one or more tubulars. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the one or more tubulars (e.g., casing string 108 and tubular string 138). The primary electromagnetic fields produce Eddy currents in the one or more tubulars. These Eddy currents, in turn, produce secondary electromagnetic fields that may be sensed and/or measurement with the primary electromagnetic fields by receivers 104. Characterization of the one or more tubulars may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the one or more tubulars (e.g., casing string 108 and tubular string 138). The EC, in turn, produce secondary electromagnetic fields that may be sensed and/or measurement by receivers 104 placed at some distance on EM logging tool 100 from transmitter 102, as shown on FIG. 1. Alternatively, the secondary electromagnetic fields may be sensed and/or measurement by a co-located receiver (not shown) or with transmitter 102 itself.

It should be understood that while casing string 108 is illustrated as a single casing string, there may be one or more tubulars disposed in the section of wellbore 110 with casing string 108. EM log data may be obtained in two or more sections of wellbore 110 with multiple layers of one or more tubulars. For example, EM logging tool 100 may make a first measurement of tubular string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of tubulars connected by collars 132. Measurements may be taken in the time-domain and/or frequency domain. These measurements may be repeated any number of times for first casing 134, for second casing 136, and/or any additional layers of casing string 108. In this disclosure, as discussed further below, methods may be utilized to determine the location of any number of collars 132 in casing string 108 and/or tubular string 138. Determining the location of collars 132 in the frequency domain and/or time domain may allow for accurate processing of recorded data in determining parameters of casing string 108 and/or tubular string 138 such as corrosion. As mentioned above, measurements may be taken in the frequency domain and/or the time domain.

In frequency domain EC, the frequency of the excitation may be adjusted so that multiple reflections in the wall of the tubular (e.g., casing string 108 or tubular string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In a RFEC regime, the mutual impedance between the coil of transmitter 102 and coil of one of the receivers 104 may be sensitive to the thickness of the tubular wall. To be more specific, the phase of the impedance varies in Equation (1) as:

$$\varphi = 2\sqrt{\frac{\omega\mu\sigma}{2}}\,t \qquad (1)$$

and the magnitude of the impedance shows the dependence in Equation (2) as:

$$\exp\left[-2\left(\sqrt{\frac{\omega\mu\sigma}{2}}\right)t\right]$$ (2)

where $\omega$ is the angular frequency of the excitation source, $\mu$ is the magnetic permeability of the tubular, $\sigma$ is the electrical conductivity of the tubular, t is the thickness of the tubular, $\varphi$ is phase of impedance, and S is skin depth. By using the common definition of skin depth for the metals in Equation (3) as:

$$\delta = \sqrt{\frac{2}{\omega\mu\sigma}}$$ (3)

The phase of the impedance varies as in Equation (4) as:

$$\varphi \cong 2\frac{t}{\delta}$$ (4)

and the magnitude of the impedance shows the dependence in Equation (5) as:

$$\exp\left[\frac{-2t}{\delta}\right]$$ (5)

In RFEC, the estimated quantity may be the overall thickness of the metal. Thus, for multiple one or more tubulars, the estimated parameter may be the overall or sum of the thicknesses of one or more tubulars. The quasi-linear variation of the phase of mutual impedance with the overall metal thickness may be employed to perform fast estimation to estimate the overall thickness of multiple one or more tubulars. For this purpose, for any given set of tubulars dimensions, material parameters, and tool configuration, such linear variation may be constructed quickly and may be used to estimate the overall thickness of one or more tubulars. Information handling system 144 may enable an operator to select analysis options, view collected log data, view analysis results, and/or perform other tasks.

Monitoring the condition of tubular string 138 and casing string 108 may be performed on information handling system 144 in oil and gas field operations. Information handling system 144 may be utilized with Electromagnetic (EM) Eddy Current (EC) techniques to inspect tubular string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the tubular such as corrosion or buckling.

Figure 2:
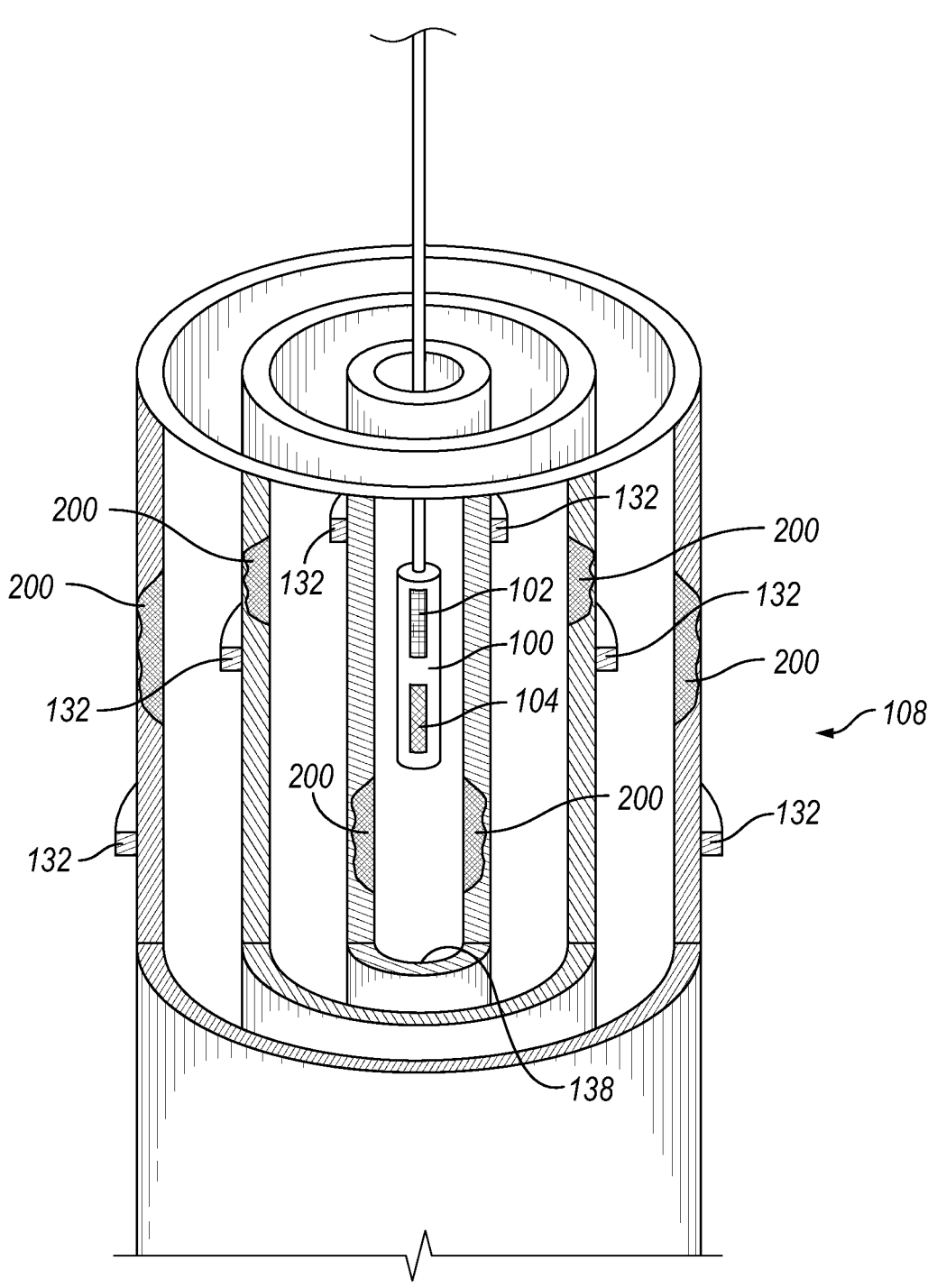
FIG. 2 illustrates an EM tool in a tubular string.

FIG. 2 illustrates EM logging tool 100 disposed in tubular string 138 which may be surrounded by one or more tubulars (e.g., first casing 134 and second casing 136) and an illustration of anomalies 200 disposed within one or more tubulars, in accordance with some embodiments. As EM logging tool 100 moves across tubular string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, tubular string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different tubulars of a multiple nested tubular configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) tubulars. By analyzing the signal levels at these different channels with inversion methods, it is possible to relate a certain received signal to a certain metal loss or gain at each tubular. In addition to loss of metal, other tubular parameters such as magnetic permeability and conductivity may also be estimated by inversion methods. It should be noted that inversion methods may include model-based inversion which may include forward modeling. However, there may be factors that complicate interpretation of losses. For example, deep tubular signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect tubular features. Inspection of tubular figures may at least partially be performed on information handling system 144.

Figure 3:
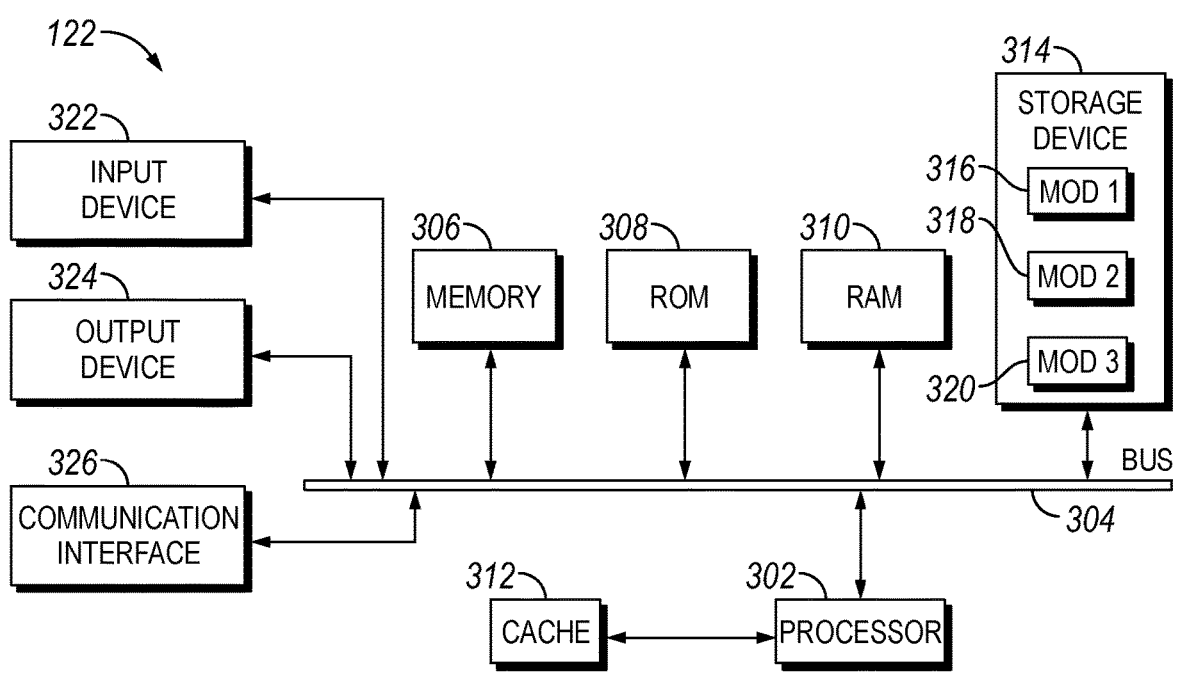
FIG. 3 illustrates an example information handling system.

FIG. 3 illustrates an example information handling system 144 which may be employed to perform various steps, methods, and techniques disclosed herein. As illustrated, information handling system 144 includes a processing unit (CPU or processor) 302 and a system bus 304 that couples various system components including system memory 306 such as read only memory (ROM) 308 and random-access memory (RAM) 310 to processor 302. Processors disclosed herein may all be forms of this processor 302. Information handling system 144 may include a cache 312 of high-speed memory connected directly with, in close proximity to, or integrated as part of processor 302. Information handling system 144 copies data from memory 306 and/or storage device 314 to cache 312 for quick access by processor 302. In this way, cache 312 provides a performance boost that avoids processor 302 delays while waiting for data. These and other modules may control or be configured to control processor 302 to perform various operations or actions. Other system memory 306 may be available for use as well. Memory 306 may include multiple different types of memory with different performance characteristics. It may be appreciated that the disclosure may operate on information handling system 144 with more than one processor 302 or on a group or cluster of computing devices networked together to provide greater processing capability. Processor 302 may include any general purpose processor and a hardware module or software module, such as first module 316, second module 318, and third module 320 stored in storage device 314, configured to control processor 302 as well as a special-purpose processor where software instructions are incorporated into processor 302. Processor 302 may be a self-contained computing system, containing multiple cores or processors, a bus, memory controller, cache, etc. A multi-core processor may be symmetric or asymmetric. Processor 302 may include multiple processors, such as a system having multiple, physically separate processors in different sockets, or a system having multiple processor cores on a single physical chip. Similarly, processor 302 may include multiple distributed processors located in multiple separate computing devices but working together such as via a communications network. Multiple processors or processor cores may share resources such as memory 306 or cache 312 or may operate using independent resources. Processor 302 may include one or more state machines, an application specific integrated circuit (ASIC), or a programmable gate array (PGA) including a field PGA (FPGA).

Each individual component discussed above may be coupled to system bus 304, which may connect each and every individual component to each other. System bus 304 may be any of several types of bus structures including a memory bus or memory controller, a peripheral bus, and a local bus using any of a variety of bus architectures. A basic input/output (BIOS) stored in ROM 308 or the like, may provide the basic routine that helps to transfer information between elements within information handling system 144, such as during start-up. Information handling system 144 further includes storage devices 314 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 314 may include software modules 316, 318, and 320 for controlling processor 302. Information handling system 144 may include other hardware or software modules. Storage device 314 is connected to the system bus 304 by a drive interface. The drives and the associated computer-readable storage devices provide nonvolatile storage of computer-readable instructions, data structures, program modules and other data for information handling system 144. In one aspect, a hardware module that performs a particular function includes the software component stored in a tangible computer-readable storage device in connection with the necessary hardware components, such as processor 302, system bus 304, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 302 executes instructions to perform "operations", processor 302 may perform the operations directly and/or facilitate, direct, or cooperate with another device or component to perform the operations.

As illustrated, information handling system 144 employs storage device 314, which may be a hard disk or other types of computer-readable storage devices which may store data that are accessible by a computer, such as magnetic cassettes, flash memory cards, digital versatile disks (DVDs), cartridges, random access memories (RAMs) 310, read only memory (ROM) 308, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 144, an input device 322 represents any number of input mechanisms, such as a microphone for speech, a touch-sensitive screen for gesture or graphical input, keyboard, mouse, motion input, speech and so forth. Additionally, input device 322 may take in data from one or more sensors 136, discussed above. An output device 324 may also be one or more of a number of output mechanisms known to those of skill in the art. In some instances, multimodal systems enable a user to provide multiple types of input to communicate with information handling system 144. Communications interface 326 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 302, that is purpose-built to operate as an equivalent to software executing on a general-purpose processor. For example, the functions of one or more processors presented in FIG. 3 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 308 for storing software performing the operations described below, and random-access memory (RAM) 310 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 144 may practice all or part of the recited methods, may be a part of the recited systems, and/or may operate according to instructions in the recited tangible computer-readable storage devices. Such logical operations may be implemented as modules configured to control processor 302 to perform particular functions according to the programming of software modules 316, 318, and 320.

In examples, one or more parts of the example information handling system 144, up to and including the entire information handling system 144, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application.

Figure 4:
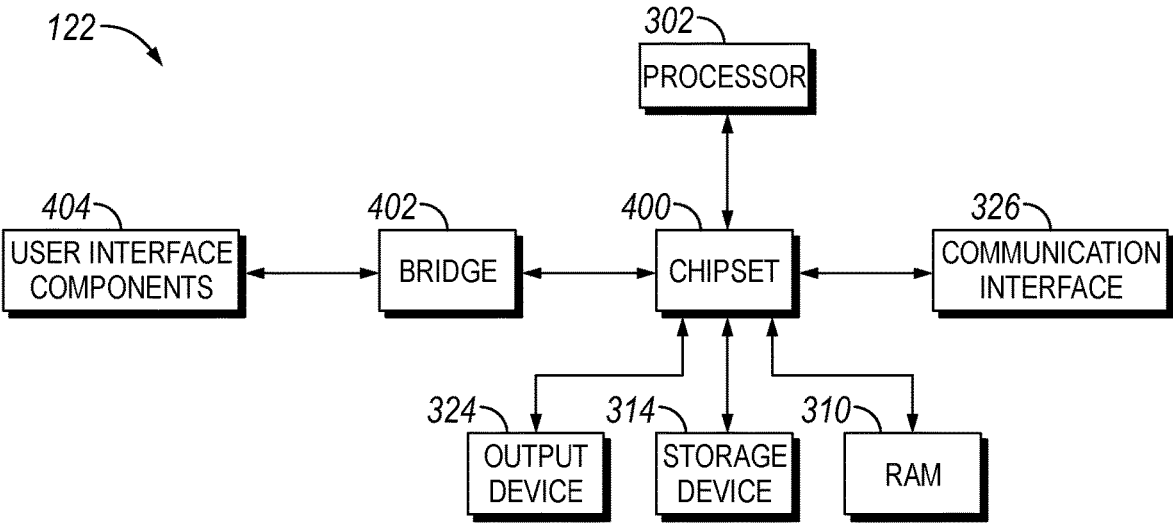
FIG. 4 illustrates another example information handling system.

FIG. 4 illustrates another example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may include a processor 302, representative of any number of physically and/or logically distinct resources capable of executing software, firmware, and hardware configured to perform identified computations. Processor 302 may communicate with a chipset 400 that may control input to and output from processor 302. In this example, chipset 400 outputs information to output device 324, such as a display, and may read and write information to storage device 314, which may include, for example, magnetic media, and solid-state media. Chipset 400 may also read data from and write data to RAM 310. A bridge 402 for interfacing with a variety of user interface components 404 may be provided for interfacing with chipset 400. Such user interface components 404 may include a keyboard, a microphone, touch detection and processing circuitry, a pointing device, such as a mouse, and so on. In general, inputs to information handling system 144 may come from any of a variety of sources, machine generated and/or human generated.

Chipset 400 may also interface with one or more communication interfaces 326 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 302 analyzing data stored in storage device 314 or RAM 310. Further, information handling system 144 receive inputs from a user via user interface components 404 and execute appropriate functions, such as browsing functions by interpreting these inputs using processor 302.

In examples, information handling system 144 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 5:
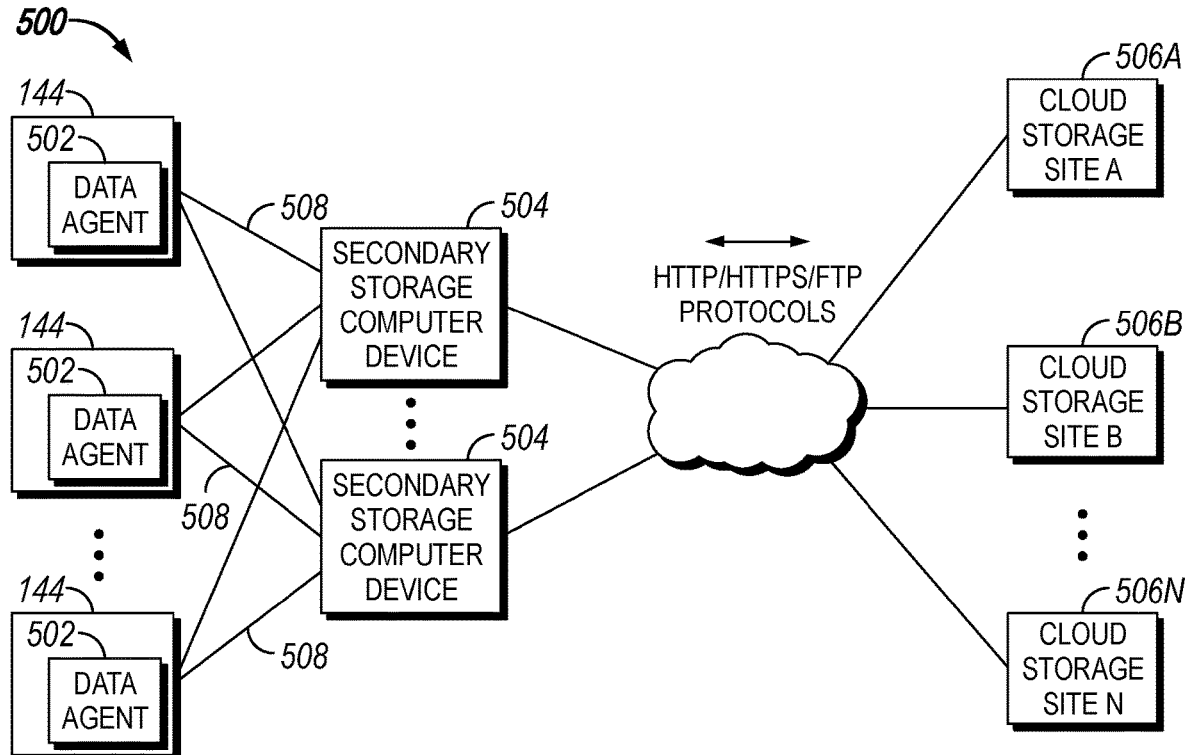
FIG. 5 illustrates an example of one arrangement of resources in a computing network.

FIG. 5 illustrates an example of one arrangement of resources in a computing network 500 that may employ the processes and techniques described herein, although many others are of course possible. As noted above, an information handling system 122, as part of their function, may utilize data, which includes files, directories, metadata (e.g., access control list (ACLS) creation/edit dates associated with the data, etc.), and other data objects. The data on the information handling system 122 is typically a primary copy (e.g., a production copy). During a copy, backup, archive or other storage operation, information handling system 122 may send a copy of some data objects (or some components thereof) to a secondary storage computing device 504 by utilizing one or more data agents 502.

A data agent 502 may be a desktop application, website application, or any software-based application that is run on information handling system 122. As illustrated, information handling system 122 may be disposed at any rig site (e.g., referring to FIG. 1) or repair and manufacturing center. Data agent 502 may communicate with a secondary storage computing device 504 using communication protocol 508 in a wired or wireless system. Communication protocol 508 may function and operate as an input to a website application. In the website application, field data related to pre- and post-operations, generated DTCs, notes, and the like may be uploaded. Additionally, information handling system 122 may utilize communication protocol 508 to access processed measurements, operations with similar DTCs, troubleshooting findings, historical run data, and/or the like. This information is accessed from secondary storage computing device 504 by data agent 502, which is loaded on information handling system 122.

Secondary storage computing device 504 may operate and function to create secondary copies of primary data objects (or some components thereof) in various cloud storage sites 506A-N. Additionally, secondary storage computing device 504 may run determinative algorithms on data uploaded from one or more information handling systems 138, discussed further below. Communications between the secondary storage computing devices 504 and cloud storage sites 506A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 506A-N, the secondary storage computing device 504 may also perform local content indexing and/or local object-level, sub-object-level or block-level deduplication when performing storage operations involving various cloud storage sites 506A-N. Cloud storage sites 506A-N may further record and maintain DTC code logs for each downhole operation or run, map DTC codes, store repair and maintenance data, store operational data, and/or provide outputs from determinative algorithms that are fun at cloud storage sites 506A-N. In examples, computing network 500 may be communicatively coupled to downhole fluid sampling tool 100. Information handling system 144 described herein may be operable to interface with EM logging tool 100 (e.g., referring to FIG. 1) for tubular inspection of defects.

Figures 6A, 6B, 6C, 6D, 6E:
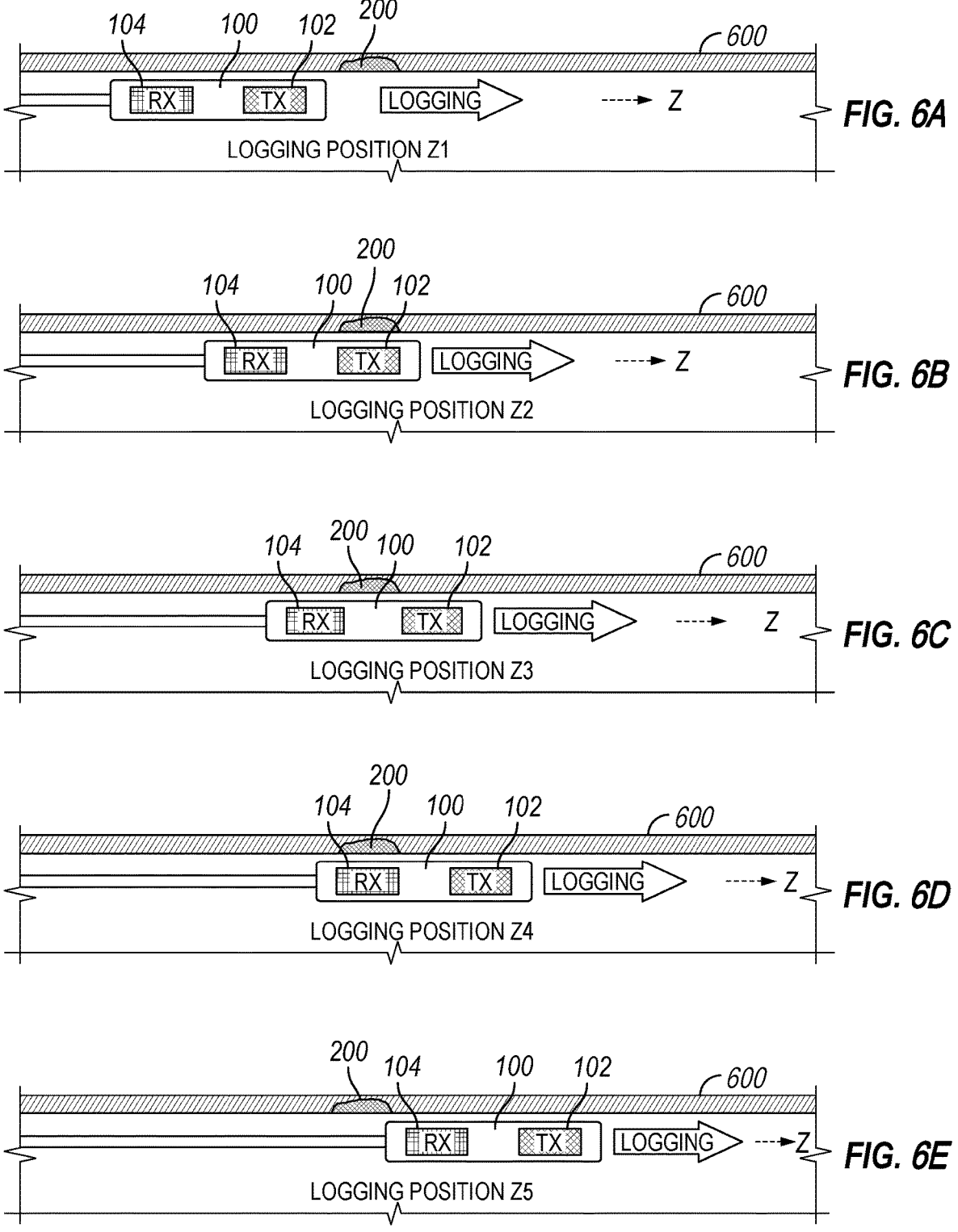
FIG. 6A illustrates an electromagnetic inspection and detection of anomalies.
FIG. 6B illustrates an electromagnetic inspection and detection of anomalies deeper along the z axis in reference to FIG. 6A.
FIG. 6C illustrates an electromagnetic inspection and detection of anomalies deeper along the z axis in reference to FIG. 6B.
FIG. 6D illustrates an electromagnetic inspection and detection of anomalies deeper along the z axis in reference to FIG. 6C.
FIG. 6E illustrates an electromagnetic inspection and detection of anomalies deeper than FIG. 6D.

FIG. 6A illustrates an electromagnetic inspection and detection of anomalies 200 (e.g., defects) or collars 132 (e.g., Referring to FIG. 2), in accordance with some embodiments. FIG. 6B illustrates an electromagnetic inspection and detection of anomalies 200 or collars 132 disposed deeper along the z axis in reference to FIG. 6A. FIG. 6C illustrates an electromagnetic inspection and detection of anomalies 200 or collars 132 disposed deeper along the z axis in reference to FIG. 6B. FIG. 6D illustrates an electromagnetic inspection and detection of anomalies 200 or collars 132 disposed deeper along the z axis in reference to FIG. 6C. FIG. 3E illustrates an electromagnetic inspection and detection of anomalies 200 or collars 132 disposed deeper along the z axis in reference to FIG. 6D. As illustrated, EM logging tool 100 may be disposed in tubular string 138, by a conveyance, which may comprise any number of one or more tubulars. As EM logging tool 100 traverses across tubular 600, one or more transmitters 102 may be excited, and a signal (mutual impedance between transmitter 102 and receiver 104) at one or more receivers 104, may be recorded. Due to eddy currents and electromagnetic attenuation, tubular 600 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two tubulars meet with a threaded connection. In order to distinguish signals from different tubulars in a multiple concentric tubular configuration, multiple transmitter-receiver spacing, and frequencies may be used. For example, short spaced transmitters 102 and receivers 104 may be sensitive to tubular string 138, while long spaced transmitters 102 and receivers 104 may be sensitive to deeper tubulars (e.g., first casing 124, second casing 136, etc.). By analyzing the signal levels at these different channels through a process of inversion, it may be possible to relate a certain received signal set to a certain set of metal loss or gain at each tubular. In examples, there may be factors that complicate the interpretation and/or identification of collars 132 and/or anomalies 200 (e.g., defects).

For example, due to eddy current physics and electromagnetic attenuation, tubulars disposed in tubular string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different tubulars of a multiple nested tubular configuration, multiple transmitter-receiver spacing, and frequencies may be used. For example, short spaced transmitters 102 and receivers 104 may be sensitive to first tubular string 138 (e.g., referring to FIG. 2), while long spaced transmitters 102 and receivers 104 may be sensitive to deeper ($2^{nd}$, $3^{rd}$ etc.) tubulars (e.g., first casing 134 and second casing 136).

Analyzing the signal levels at different channels with an inversion scheme may relate a certain received signal to a certain tubular parameter. Herein, tubular parameters may be defined as loss of metal, magnetic permeability, electrical conductivity individual thickness of each tubular, percentage metal loss or gain of each tubular, the individual magnetic permeability of each tubular, the individual electrical conductivity of each tubular, the total thickness of each tubular, the eccentricity of each tubular, and the inner diameter of each tubular. Tubular parameters may be estimated by inversion, to be discussed below. There may be several factors that complicate interpretation of losses. For example, factors may comprise deep tubular signals that are significantly lower than other signals. In addition, double dip indications appear for long spaced transmitters 102 and receivers 104 may be another factor which complicates interpretation of losses. Further, factors may comprise spatial spread of long spaced transmitter-receiver signal for a collar 132 up to 6 feet long, material parameters of the tubulars such as magnetic permeability and electrical conductivity, and a non-unique inversion which may output multiple solutions to the same set of inputs. Due to these factors, an advanced algorithm or workflow may be used to accurately inspect tubular features, for example when more than two tubulars may be present in tubular string 138.

During logging operations as EM logging tool 100 traverses across tubular 600 (e.g., referring to FIG. 6), a measurement log, which may also be referred to as an electromagnetic (EM) log, of the received signals may be produced and analyzed. The EM log may be calibrated prior to running inversion to account for the deviations between measurement and simulation (forward model). The deviations may arise from several factors, including the nonlinear behavior of the magnetic core, magnetization of tubulars, mandrel effect, and inaccurate well plans. Multiplicative coefficients and constant factors may be applied, either together or individually, to the measurement EM log for calibration. Calibration is important when multiple tubulars are inspected. It is common for well plans to have multiple tubulars.

Figure 7:
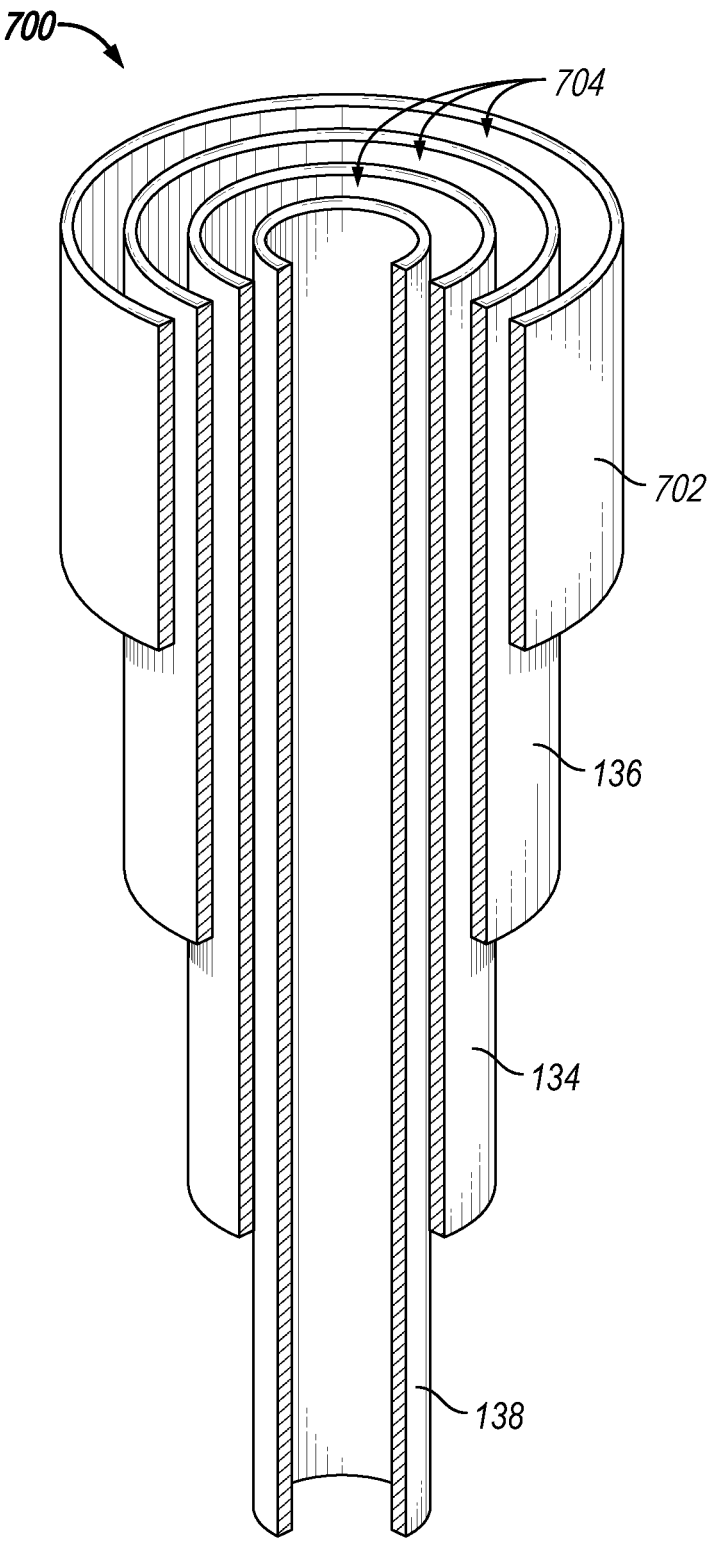
FIG. 7 illustrates an example of a multiple tubular well plan.

FIG. 7 illustrates an example of a multiple tubular well plan 700 in accordance with some embodiments. Depending on the design of well plan 700, well construction may have between two and four main components. These components include conductor, surface, intermediate and production casings. After completion of the well, a tubing may be inserted to pump hydrocarbon products. In this example, well plan 700 may comprise one or more tubulars. For example, tubular string 138, first casing 134, second casing 136, a conductor casing 702, and wherein cement may be disposed in annulus 704 between each casing. However, it should be noted that well plan 700 may include any number of tubulars, casings, tubulars, and/or the like. Well plan 700 is not limited or bound by the four tubulars that are displayed in FIG. 7. When EM logging tool 100 is used to monitor the tubular condition a log may be produced.

Monitoring the condition of the casing strings is crucial in oil and gas field operations. As discussed above, EM techniques may be used to inspect tubulars, casings, tubulars, and/or the like. Generally, an eddy current (EC) technique is a common EM technique that is utilized for monitoring the condition of casing strings. In EC, when the transmitter coil emits the primary transient EM fields, eddy current is induced in the surrounding casings. The eddy currents then produce secondary fields, which may be received along with the primary fields by one or more receivers 104. EM logging tool 100 may utilize two or more transmitters 102 and may utilize two or more receivers 104, operating at multi-frequencies. By using the multi-channel measurements, the thickness of tubular string 138, first casing 124, second casing 136, etc. (e.g., referring to FIGS. 1 and 7) may be obtained through inversion. multi-channel measurements are multi-frequency, multi-spacing measurements recorded by a frequency-domain tool, recorded by a time-domain tool at receivers with different sizes and at different time delays, and are acquired with different transmitters active at different times.

The thickness of tubular string 138, first casing 124, second casing 136, and/or additional casing may be computed with an inverse optimization using through one or more measurement logs created from one or more measurement operations, discussed above. The inversion problem searches for tubular parameters that minimizes misfit between measurements at a given depth point and synthetic responses computed using a physical model. Since the inverse problem is ill-posed, in the absence of other information, more than one solution may fit the measurements. Thus, the inversion result may result in non-continuous estimated thickness of individual tubulars (i.e., of tubular string 138, first casing 124, second casing 136, etc.). An asymmetric regularization function may be added to a cost function used in the inversion to constrain the solution. Herein an asymmetric regularization function may be a step function, rectified sigmoid function, rectified linear function, or a sigmoid function. Discussed below are methods and systems that may utilize a data-driven method for constraining the inversion model in a way that produces one or more physical solutions. For example, a Bayesian approach is used to infer from the data the direction of corrosion progression on one or more tubulars within a given zone (outside-in versus inside-out) and apply previous measurements from measurement operations, described above, as a constraint in a subsequent inversion. The result of the constrained inversion is therefore more stable.

The Bayesian approach may be applied to process the data from one or more measurement logs taken during one or more measurement operations. Utilizing a Bayesian approach may stabilize results from inversion operations. Statistically, Bayesian theorem describes the probability of an event given some prior knowledge related to this event and its condition. The formula is shown below:

$$p(m \mid d) = \frac{p(d \mid m)p(m)}{p(d)} \tag{6}$$

where dis measurement data, and mm is one or more model parameters that may be inferred. Equation (6) may derive the posterior probability of m given d, through the prior probability p(m) and the likelihood of the observed data, p(d|m). The variable p(d|m) is the probability that the model m may produce the observed data d. Theoretically, for a given model parameter, the output should be fixed. However, in practice, there may be factors that may affect the observed data including measurement error, external noise, and/or the like.

To assess data, the noise that follows the Gaussian distribution may be assumed. Therefore, the likelihood function may be expressed as:

$$p(d \mid m) = \frac{1}{\sqrt{(2\pi)^N |C_d|}} e^{\left[-\frac{1}{2}(d - D(m))^T C_d^{-1}(d - D(m))\right]} \tag{7}$$

where $D(m)$ is synthetic data without any external noise based on given model parameter m. Additionally, $C_d$ is the covariance matrix of the data error $d-D(m)$ and the variable p(m) is the prior probability of the model parameters. Further, N is the number of variables and T is the transposed of a vector or matrix. The variable p(d) is the probability distribution of the measurement data d, which is also known as:

$$p(d) = \int_m p(d|m)p(m)dm \tag{8}$$

This probability remains constant for all possible models being considered. Therefore, the posterior probability is proportional to the likelihood function:

$$p(m|d) \propto p(d|m)p(m) \tag{9}$$

The model estimates the posterior probability distribution with at least a posteriori estimate (MAP) and may be solved using statistical methods, such as Markov chain Monte Carlo, etc. The data-driven method described above implements a Bayesian inversion to produce one or more physical solutions. Herein, one or more physical solutions may comprise tubular thickness, magnetic permeability, electrical conductivity, and tubular eccentricity.

Figure 8:
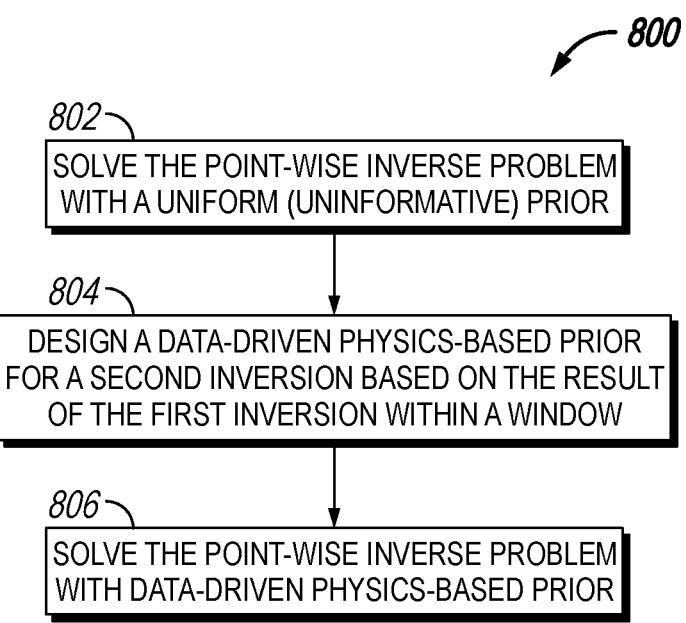
FIG. 8 illustrates a workflow for applying a Bayesian inversion.

FIG. 8 illustrates workflow 800 for applying a Bayesian inversion. In examples, workflow 800 may be performed on information handling system 144 (e.g., referring to FIG. 1). A Bayesian inversion may utilize prior information to estimate a model parameter, described below. Herein, prior information may include tubular corrosion profiles for all interior and exterior tubulars. Prior information may be obtained from measurement techniques described above. The tubular profiles may comprise the tubular thickness of each tubular as a function of depth. Workflow 800 may begin with block 802, which may solve a point-wise inverse problem. To solve the point-wise inverse problem, a prior probability of the model parameters m may be determined from prior information. Additionally, a uniform distribution may be set for the probability density function of model parameters m in a form:

$$p_1(m) = \mathcal{U}(m_{min}, m_{max}) \tag{10}$$

Then the posterior probability may be simplified as:

$$p_1(m|d) \propto p(d|m) \tag{11}$$

Thus, the Bayesian inversion problem may be solved at each depth point within the inversion zone by finding the values of the model parameters that maximize the likelihood function over the parameter space. The first model parameter $m_1$ may be found utilizing:

$$m_1 = \underset{m}{\operatorname{argmax}} p(d = d_{obs.} \mid m) \qquad (12)$$

Generally, a closed-form solution to the maximization problem is unknown or unavailable, thus, the maximum likelihood estimate problem may be found via numerical optimization (e.g., inversion algorithms). The first model parameter $m_1$ from block 802 may be utilized for block 804. In block 804, a data-driven physics-based model may be used in a second inversion. Additionally, the second inversion may further be based on the result of the first inversion (i.e., $m_1$). The prior distribution of a second inversion of model parameters m, $p_2(m)$ may be designed, based on the estimated model parameters $m_1$ within a given depth window (also referred to as an inversion zone). In N≥3 The window may be defined as:

$$\Sigma_{window} |t_N - t_{N,nom}| > \Sigma_{window} |t_2 - t_{2,nom}| \qquad (13)$$

On average within the given inversion zone, the metal loss on the outermost casing may be larger than that on the innermost casing, it is concluded that corrosion progresses from outer tubulars inwards towards inner tubulars. Therefore, $p_2(m)$ may be set to favor solutions with more metal loss on the outer tubulars than that on the inner tubulars utilizing:

$$p_2(m) \propto \max(\Delta t(3:N) - \Delta t(2:N-1), 0) \qquad (14)$$

Conversely, if N<3 the window may be defined as:

$$\Sigma_{window} |t_N - t_{N,nom}| < \Sigma_{window} |t_2 - t_{2,nom}| \qquad (15)$$

Generally, on average within the given inversion zone, the metal loss on the innermost casing is larger than that on the outermost casing, it is concluded that corrosion progresses from inner tubulars outwards towards outer tubulars. Thus, $p_2(m)$ is set to favor solutions with more metal loss on the inner tubulars than that on the outer tubulars, utilizing:

$$p_2(m) \propto \max(\Delta t(2:N-1) - \Delta t(3:N), 0) \qquad (16)$$

The solutions of the inversion found in block 804 may be utilized in block 806. In block 806 a point-wise inverse problem with data-driven physics-based may be solved. In block 806, Bayes rule may be applied again at each depth point to solve for the maximum a posteriori estimate (MAP) estimates of the model parameters with the prior being $p_2(m)$, utilizing:

$$p_2(m \mid d) = \frac{p(d \mid m) p_2(m)}{p(d)} \qquad (17)$$

$$m_2 = \underset{m}{\operatorname{argmax}} p_2(m \mid d = d_{obs.}) \qquad (18)$$

As such the thickness of each tubular may be estimated.

Figure 9:
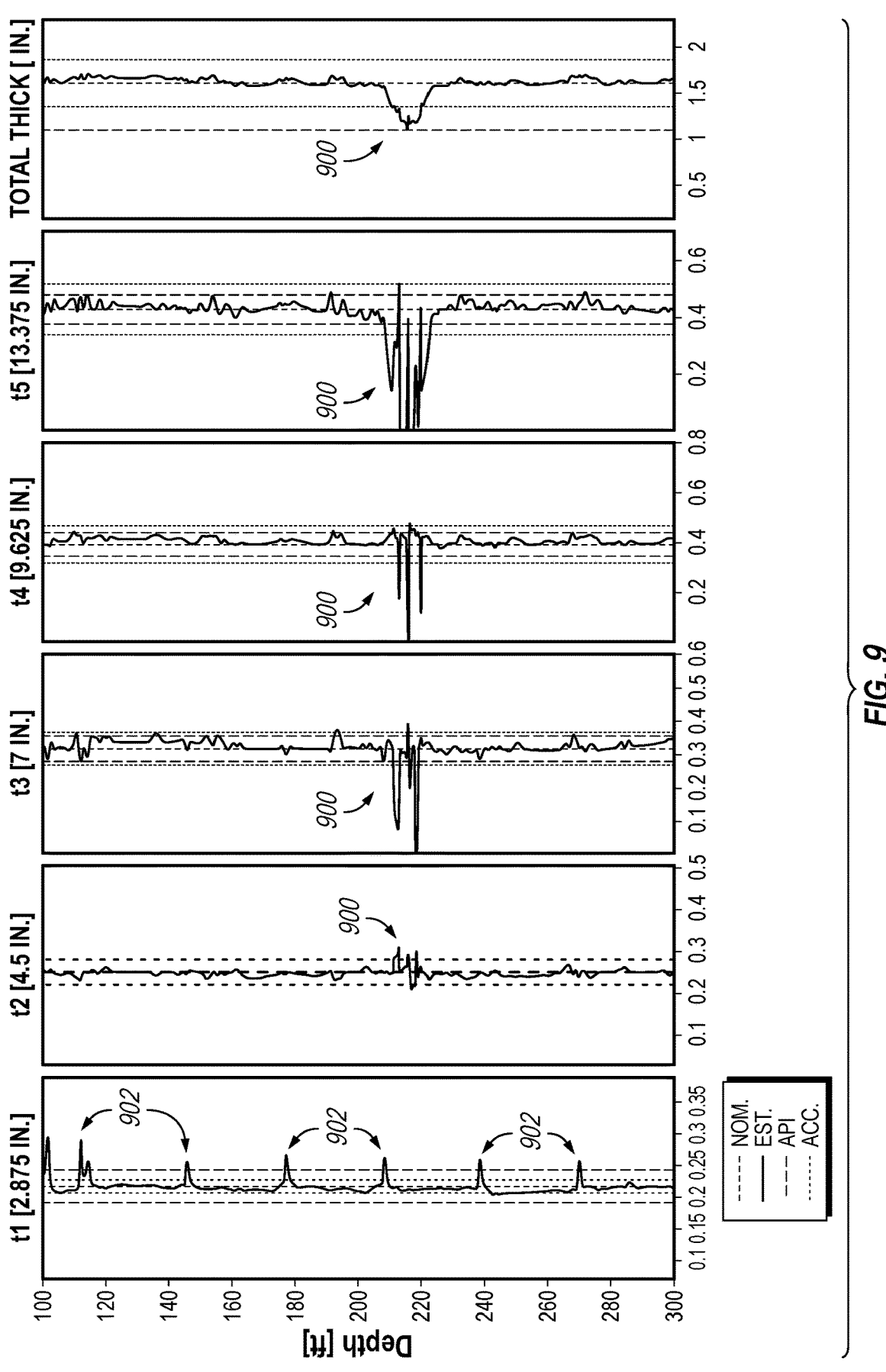
FIG. 9 illustrates results for estimated thickness of individual tubulars from a first inversion.

FIG. 9 illustrates results for estimated thickness of individual tubulars from a first inversion that used uniform (uninformative) prior. Each result represented in FIG. 9, illustrates a result from block 802 (e.g., referring to FIG. 8), or a first inversion that used uniform (uninformative) prior with different tubular thickness t. The non-uniqueness inherent to the inversion process manifests as abrupt jumps 900 in estimated thickness of individual tubulars. Thickness points 902 represent the cumulative thickness of all tubulars with different thickness t.

Figure 10:
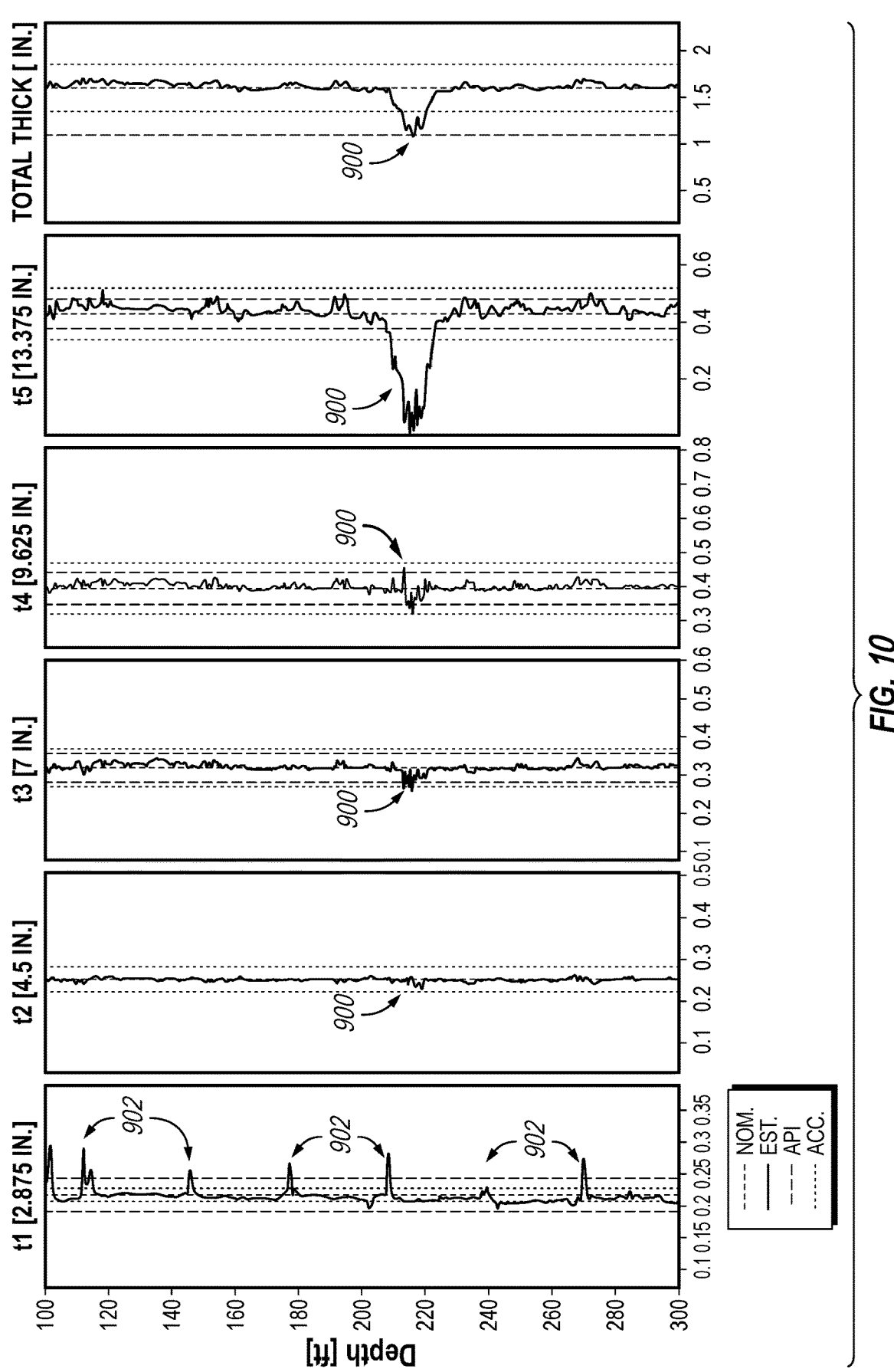
FIG. 10 illustrate results estimated thicknesses from the second inversion.

FIG. 10 illustrate results estimated thicknesses from the second inversion. Each result represented in FIG. 10 represents a result from block 804 (e.g., referring to FIG. 8), or data-driven physics-based prior for a second inversion (i.e., block 802) with different tubular thickness t. FIG. 10 shows the individual tubular thickness are smoother and the inversion is more stable when compared to FIG. 9. Abrupt jumps 900 (e.g., referring to FIG. 9) have been reduced in FIG. 10. Additionally, FIG. 10 represents the cumulative thickness of all tubulars with different thickness t. As such, improvements to a traditional inversion may be seen with the implementation of a Bayesian inversion. As noted above, other methods and systems that do not utilize a Bayesian inversion may be applied to improve inversion results.

As previously described, traditional inversions may produce more than one solution to mathematically fit measurement data. Finding an optimal regularization parameter may be based on minimizing the mirroring between tubulars. Herein, mirroring refers to the compensation between tubular thicknesses, which is metal loss on one tubular offset by metal gain on the other. During this process, a regularization parameter may be added to a cost function to constrain the solution to a predicted physical solution.

An asymmetric regularization function is employed in the cost function, which may be utilized to find the optimal regularization parameters automatically. The inversion of the set of tubular parameters may employ a cost function that includes a regularization term. This disclosure uses an asymmetric regularization function imposing higher penalty on estimated thickness values above the nominal thicknesses and lower penalty on estimated thickness values below the nominal thicknesses. The cost function may be defined as:

$$F(x) = \frac{1}{2M} \left\| W_{m,abs} \times \left[ \operatorname{abs} \left\{ \frac{s(x)}{w_{cal}m} \right\} - 1 \right] \right\|_2^2 + \qquad (19)$$

$$\frac{1}{2M} \left\| W_{m,angle} \times \operatorname{angle} \left\{ \frac{s(x)}{w_{cal}m} \right\} \right\|_2^2 + \sum_{i=1}^{N_p} \lambda_i u(t_i - t_{nomi})$$

utilized in the inversion may comprise three terms, the magnitude misfit, the phase misfit and a regularization term. Where x is a vector of N unknowns as:

$$x = [t_1, \ldots, t_{N_p}, \mu_1, \ldots, \mu_{N_p}, \ldots] \qquad (20)$$

$N_p$ is the number of tubulars, m is a vector of M complex measurements at different receivers and frequencies as:

$$M = N_{rx} \times N_f \qquad (21)$$

and where $N_{rx}$ is the number of receivers and $N_f$ is number of frequencies. Additionally, s(x) is a vector of M for forward modeling responses, $W_{m,abs}$, $W_{m,angle}$ are weight matrices for measurements magnitude and phase. Additionally, M×M diagonal matrices may be used to assign different weights on different measurements based on the relative quality or importance of each measurement, $W_{cal}$ is a M×M diagonal matrix of complex calibration constants, $\lambda_i$ is a regularization parameter for each tubular thickness, and the regularization parameters as:

$$\lambda = [\lambda_1, \lambda_2, \ldots, \lambda_{N_p}] \qquad (22)$$

Additionally, $t_i$ is a tubular thickness to be estimated for the $i_{th}$ tubular, $t_{nomi}$ is a nominal tubular thickness for the $i_{th}$ tubular, u is an asymmetric function (e.g., a step function), as:

$$u = \begin{cases} \lambda_i, & t_i - t_{nomi} > 0 \\ 0, & t_i - t_{nomi} \leq 0 \end{cases} \qquad (23)$$

The method to find an optimized regularization parameter of an asymmetric regularization term described above implements minimizing the mirroring between tubulars to produce physical solutions.

Figure 11:
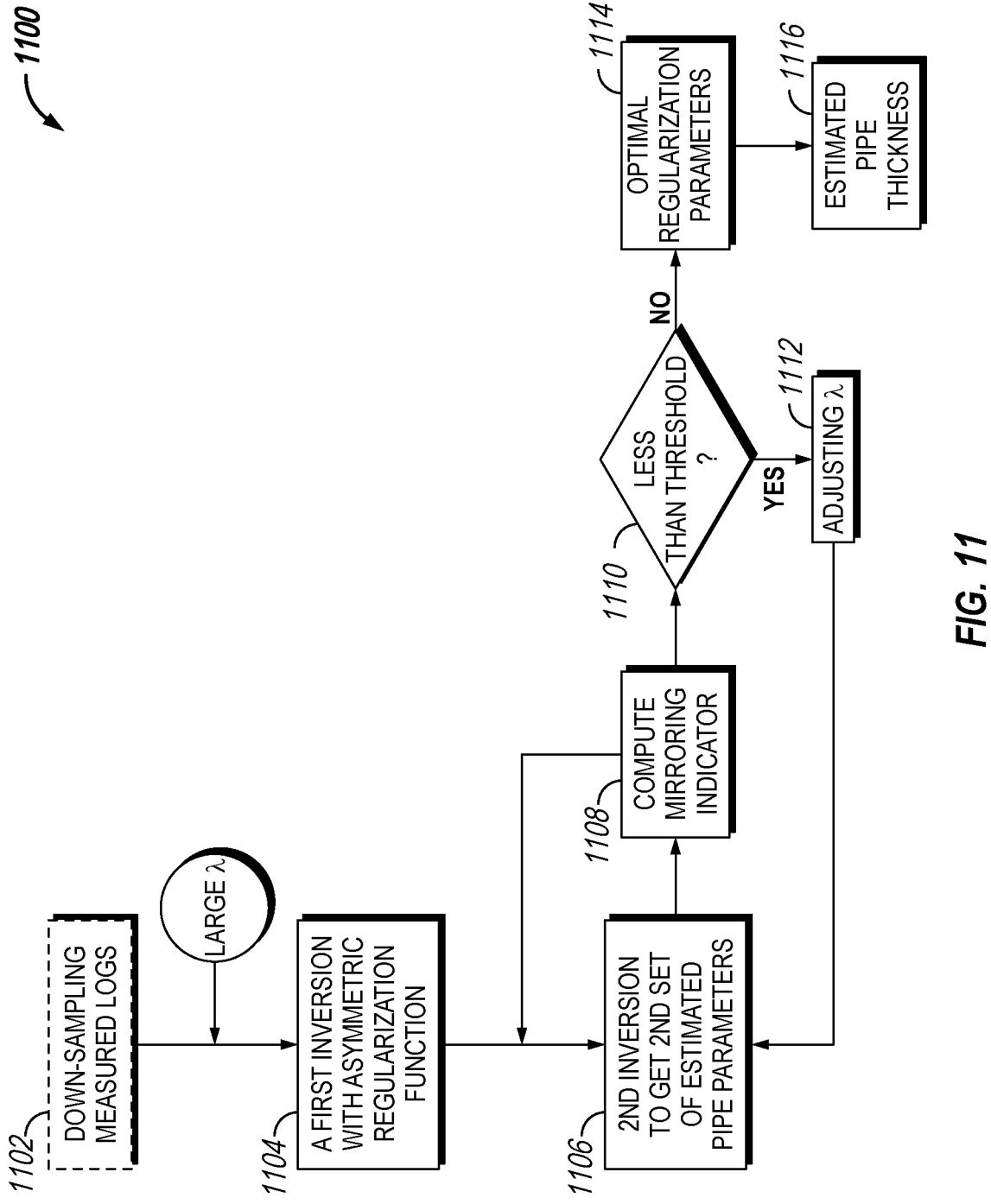
FIG. 11 illustrates workflow for estimating tubular thickness with an optimized regularization parameter.

FIG. 11 illustrates workflow 1100 for estimating tubular thickness with an optimized regularization parameter while implementing mirroring techniques. Workflow 1100 may be performed on information handling system 144 (e.g., referring to FIG. 1). In Block 1102 a down-sampling of measurement logs may be performed. This may be accomplished by disposing an EM logging tool 100 into wellbore 110 (e.g., referring to FIG. 1) to perform a measurement operation. As noted above, EM logging tool 100 may comprise at least one transmitter 102 and at least one receiver 104. During measurement operation, EM logging tool 100 may acquire measurements in a frequency domain to form one or more measurement logs. The measurement logs may be optionally down sampled before being fed into automatic regularization procedure.

In block 1104, the measurement data from block 1102 is processed with a first inversion using an asymmetric regularization function. Herein, the asymmetric regularization function may be a step function, a rectified sigmoid function, a rectified linear function, or a sigmoid function. The first inversion may be performed with asymmetric regularization functions and a first vector of regularization parameters to obtain a first set of estimated tubular parameters via traditional methods. In the first inversion, the regularization parameter A may be set to a large value which may range from 1-20. A large value is initially used such that it may be iteratively decreased until it is less than an adjustable threshold, to be discussed in detail below. Further, block 1104 may design a data-driven prior with the first set of estimated tubular parameters, as described above. Once obtained, the first set of estimated tubular parameters may be utilized in block 1106.

In block 1106, a second inversion with asymmetric regularization function may be performed to obtain a second set of estimated tubular parameters. A second inversion is performed with asymmetric regularization functions and a second vector of regularization parameters as described in Equations (19)-(23). Asymmetric regularization functions may comprise step functions, sigmoid, or rectified linear functions. Additionally, the second inversion may incorporate a data-driven prior. The data-driven prior may be based on comparing the first set of estimated tubular parameters among the nested tubulars within an inversion zone and making a decision on the direction of metal loss progression through the tubulars. The norm of the second regularization parameters vector is essentially lower than the norm of the first regularization parameters vector, to obtain a second set of estimated tubular parameters. The norm of the regularization parameters vector is an L2-norm defined as the square root of the sum of squares of the individual regularization parameters, or an L1-norm defined as the sum of the absolute values of the regularization parameters. The regularization parameters vector may comprise scaling coefficients that determine the strength of regularization applied to the respective tubular parameters. The second set of estimated tubular parameters may further be used to determine mirroring effects.

In block 1108, a mirror indicator may be computed. Herein, a mirror indicator is an evaluation of the similarity between two sets of tubular parameters. One or more mirroring indicators may be computed between the second sets of estimated tubular parameters from block 1106, wherein the first set of estimated tubular parameters is used as a baseline reference. The mirror indicator may be determined by cross-correlation, cross-covariance, correlation coefficient, and/or the like which may be computed over sufficiently long depth interval and may be a real number. It shows the level of mirroring between estimated tubular thicknesses. A cross correlation may be performed between any pair of tubulars by first computing the mean of the point-wise product of the estimated thickness logs of each pair of tubulars. The cross covariance will be a match or non-match between the pair of tubulars whether or not their thickness is within a threshold. Such a threshold may be adjustable and within the range of 0.001 inches (25 µm) to 5 inches (13 cm). Similarly, a cross-covariance may be performed by computing the mean of the product of estimated thickness logs less their mean value of each pair of tubulars. A correlation coefficient may be performed by normalizing the covariance of each pair of tubulars by the standard deviations of the two tubulars.

Block 1110 determines if the mirroring indicator is more or less than an adjustable threshold. Herein an adjustable threshold may range from 0.001-100 percent. For example, if the mirroring indicator is determined by a cross correlation and the threshold of in block 1110 is (e.g., 5%), as such, the mirroring indicator must be less than 5% to be acceptable. If the mirroring indicator is less than the threshold, block 1112 adjusts λ and blocks 1106-1110 are repeated until the mirroring indicator is greater than the threshold. In examples, λ may be iteratively adjusted constantly, linearly, or by any other method. Constant adjustments may be increasing or decreasing λ by a constant factor ranging from 0.00010.1. Linear adjustments may increase or decrease λ by 0.0001 in the first iteration, 0.001 in the second iteration, and so forth.

From block 1108, block 1114 may be performed to find optimal regularization parameters for the estimated tubular parameters. This may be performed by adjusting the regularization parameter vector λ, and repeating blocks 1106 and 1108 until the mirroring indicator in block 1108 reaches an adjustable threshold. In examples, the regularization parameter may be optimized when a threshold is met. Take the minimum-norm regularization parameters vector subject to an adjustable threshold as the optimal parameters. The adjustable threshold is defined based on the maximum acceptable level of mirroring between estimated tubular parameters (e.g., 2%, 5%, 10% etc.).

In block 1116, the final tubular thickness is determined from at least set of estimated tubular parameters from block 1108 and optimal regularization parameters for the estimated tubular parameters from block 1114. Block 1116 may be performed, as described in Equation (19). The results of utilizing workflow 1100 are illustrated in FIG. 12.

Figure 12:
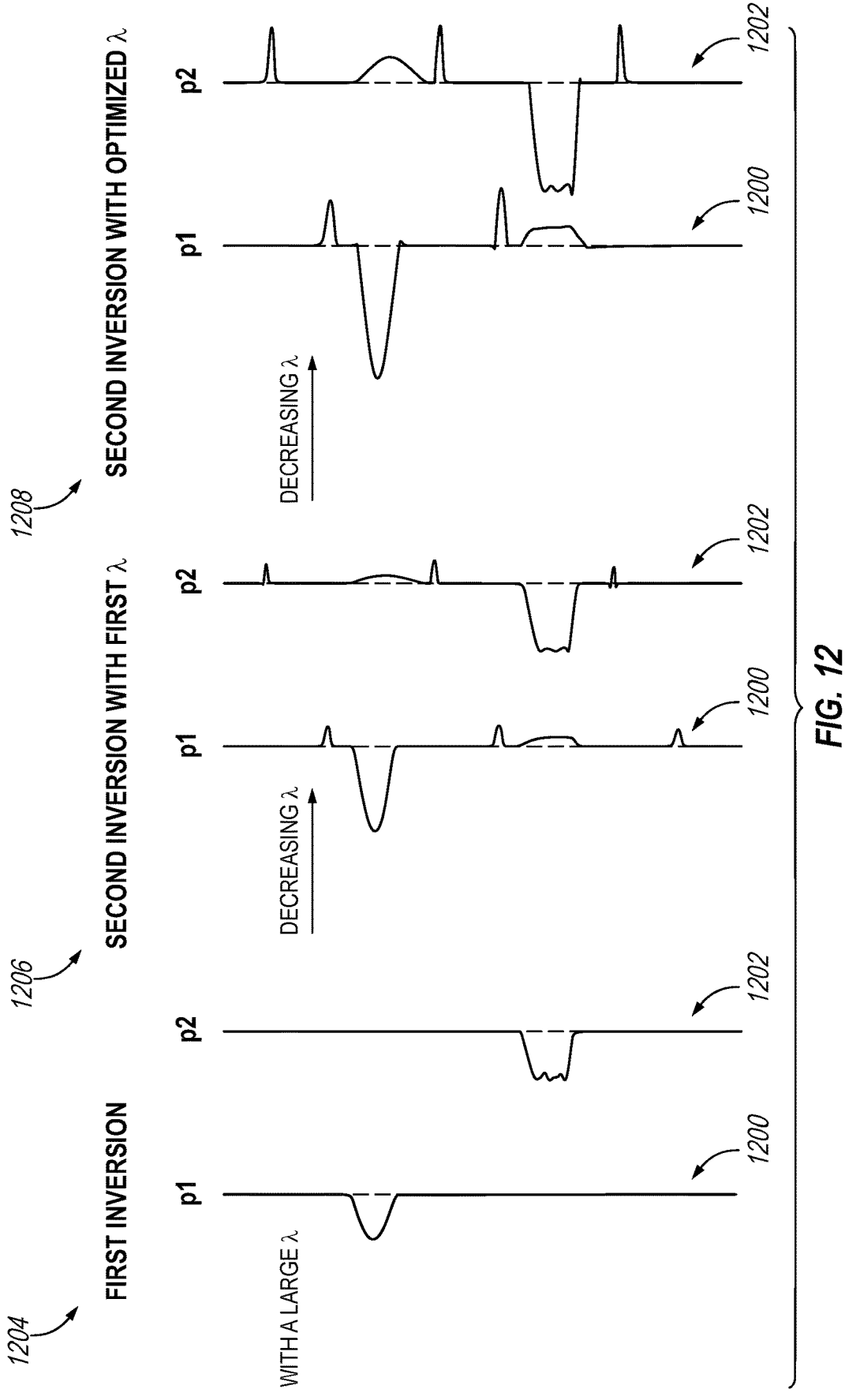
FIG. 12 illustrates results of inversions performed by a previous workflow.

FIG. 12 illustrates results of inversions performed by workflow 1100 (e.g., referring to FIG. 11). In examples, there are two tubulars 1200 and 1202 in the inversion zone. First inversion 1204 shows the estimated tubular thickness from the first inversion performed in block 1102. Due to the use of the asymmetric regularization function with a large regularization parameter A in Equation (19), the inversion only allows metal loss. Additionally, FIG. 12 illustrates a first inversion with first λ 1206. In in a first inversion with first λ 1206, tubular thickness may be smaller than the nominal thickness and features with metal gain such as collars and other hardware or jewelry are not able to present on tubulars 1200 or 1202. By running the regularization parameter λ. Thus, in a first inversion with first λ 1206 may allow metal gains on tubulars 1200 or 1202. In a second inversion with optimized λ, a mirror indicator is computed for evaluation. A mirror indicator may be computed using cross-correlation, cross-covariance, correlation coefficient, and/or the like. The mirroring indicator may then be used iteratively to optimize λ as described in blocks 1106-1110. The result of the optimized λ may be second inversion with optimized λ 1206.

As described below cross-covariance may use implement Table 1. Table 1 illustrates an example of cross covariance between a first and second set of cross-covariance values. Herein, p1 indicates a first tubular (inner tubular, noted in FIG. 12 as tubular 1200) and p2 indicates a second tubular (outer tubular, noted in FIG. 12 as tubular 1202). As such, the top left box indicates the difference in thickness as inches or centimeters between the first and second sets of inversions for the first tubular. Similarly, the bottom right box indicates the difference in thickness as inches or centimeters between the first and second sets of inversions for the second tubular. The top right and bottom left boxes indicate the difference in thickness as inches or centimeters for the first tubular and second tubular for each of the two sets of inversions with the baseline results. Negative values for the top right and bottom left boxes indicate when mirroring shows as the cross-covariance matrix diagonal values are small negative values. In Table 1, p1 shows more variance than p2. The regularization parameter for tubular 2 may be decreased to allow more metal gain on tubular 2.

TABLE 1

| Cross-covariance matrix | | |
| --- | --- | --- |
| | p1 | p2 |
| p1 | 0.1 | −0.01 |
| p2 | −0.01 | 0.05 |

By decreasing λ iteratively in block 1112, the metal gain becomes larger. As a result, the mirroring becomes severe, and the mirroring indicator grows larger, yielding a larger difference between the first and second tubular thicknesses.

Figure 13:
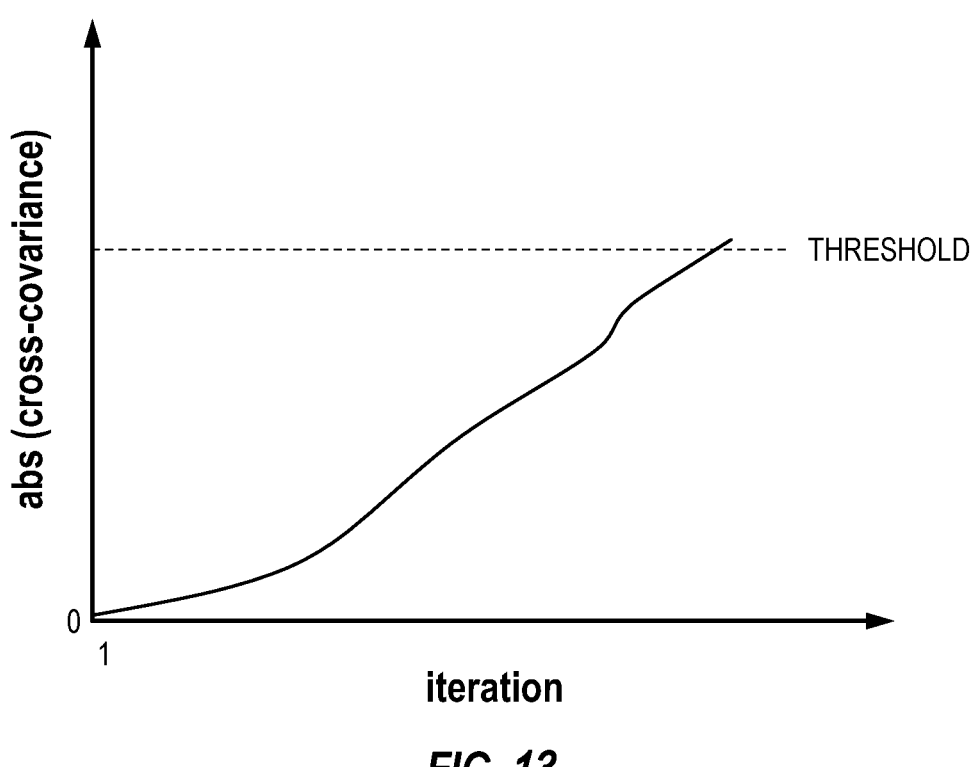
FIG. 13 illustrates a graph showing when an iteration is stopped.

FIG. 13 illustrates a graph showing when an iteration is stopped as the mirroring level exceeds the adjustable threshold and the final optimal regularization parameter A is obtained. The iteration is stopped when the mirroring level exceeds the adjustable threshold and the final optimal regularization parameter A is obtained, as described in block 1110.

Figure 14A:
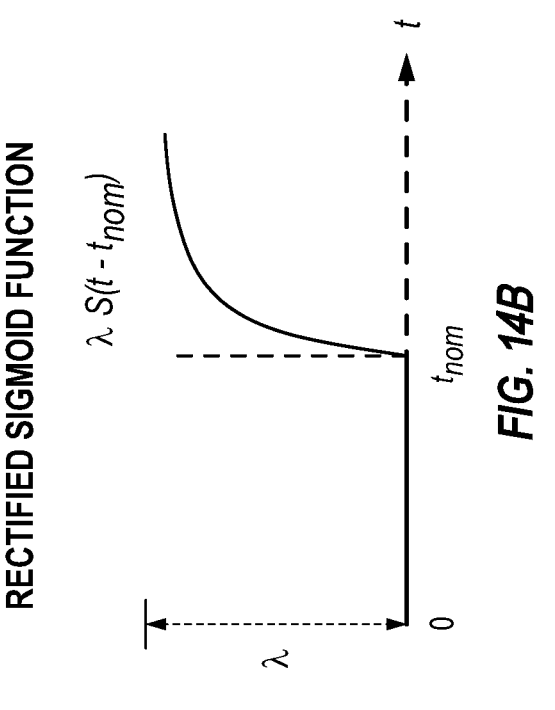
FIG. 14A illustrates that the asymmetric regularization functions within the cost function is a step function.
Figure 14B:
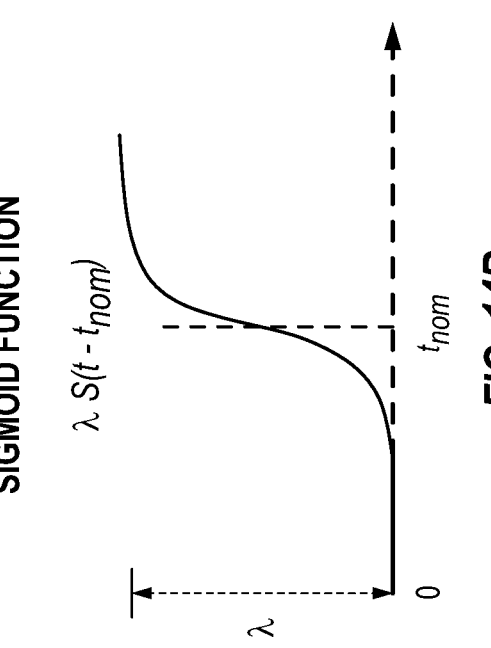
FIG. 14B illustrates that the asymmetric regularization functions within the cost function is a rectified sigmoid function.
Figure 14C:
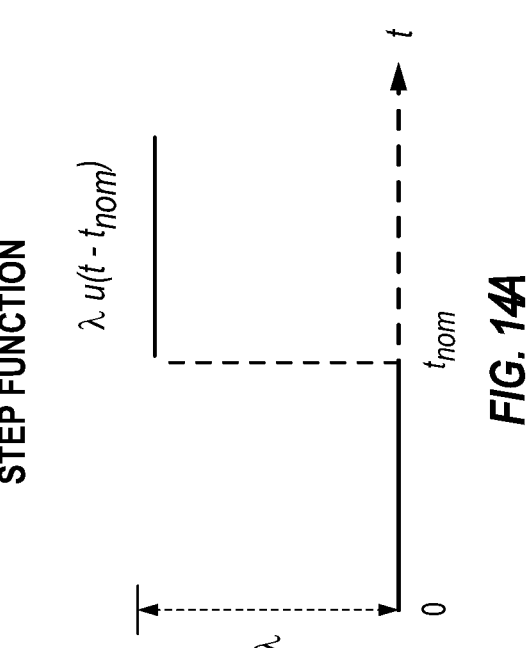
FIG. 14C illustrates that the asymmetric regularization functions within the cost function is a rectified linear function.
Figure 14D:
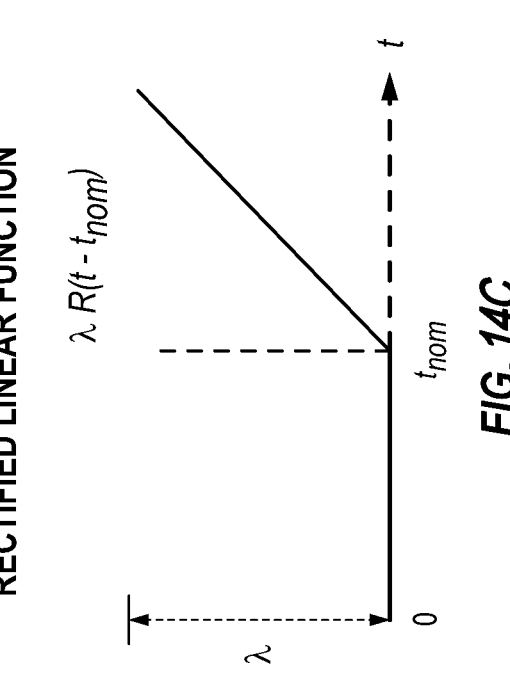
FIG. 14D illustrates that the asymmetric regularization functions within the cost function is a sigmoid function.

FIGS. 14A-14D illustrate different examples of asymmetric regularization functions within the cost function. As described above a cost function may employ step function, rectified sigmoid function, rectified linear function, or a sigmoid function. For example, FIG. 14A illustrates that the asymmetric regularization functions within the cost function is a step function. FIG. 14B illustrates that the asymmetric regularization functions within the cost function is a rectified sigmoid function. FIG. 14C illustrates that the asymmetric regularization functions within the cost function is a rectified linear function. FIG. 14D illustrates that the asymmetric regularization functions within the cost function is a sigmoid function. As described above, the asymmetric regularization function may be a step function, a rectified sigmoid function, a rectified linear function, or a sigmoid function. However, similar examples may be provided as well.

Improvements over current technology described above comprise a Bayesian approach to incorporate data-driven physical constraints such as the direction of defect progression into the problem of multi-tubular corrosion detection. Additionally, the use of asymmetric regularization functions are employed in cost function to solve casing corrosion detection problems. The proposed method saves the effort and time for having to run a separate inversion for estimating only the metal loss on the tubulars, before running the more general inversion that estimates both metal loss and gain.

Additionally, the proposed Bayesian approach incorporates a priori physical constraints such as the direction of defect progression into the inversion model to obtain a smoother and more realistic results. The proposed asymmetric regularization method improves the answer products to obtain more reliable estimated casing metal gain/loss. This disclosure finds the optimal regularization parameters automatically for the regularization term in cost function based on minimizing the mirroring between tubulars, wherein mirroring refers to the compensation between tubular thicknesses (metal loss on one tubular offset by metal gain on the other) in the inversion procedure. This method and system for determining corrosion along a tubular in a wellbore may include any of the various features of the compositions, methods, and system disclosed herein, including one or more of the following statements.

Statement 1: A method comprising disposing an electromagnetic (EM) logging tool in a wellbore, wherein the EM logging tool comprises a transmitter disposed on the EM logging tool, and a receiver disposed on the EM logging tool. The method may further comprise transmitting an EM field from the transmitter into one or more tubulars to energize the one or more tubulars with the EM field thereby producing an eddy current in the one or more tubulars, and measuring the field generated by the eddy current in the tubulars with the receiver on at least one channel to obtain a plurality of measurements. The method may further configured for forming a measurement log from the plurality of measurements, solving a first inverse problem to obtain a first set of estimated tubular parameters, solving a second inverse problem with the first set of estimated tubular parameters to obtain a second set of estimated tubular parameters, and determining a final tubular thickness of the one or more tubulars with at least the second set of estimated tubular parameters.

Statement 2: The method of statement 1, further comprising designing a data-driven prior based at least in part on the first set of estimated tubular parameters.

Statement 3: The method of statement 2, further making a decision from a direction of metal loss progression through the one or more tubulars with at least the data-driven prior.

Statement 4: The methods of statements 1-3, wherein solving the first inverse problem comprises one or more asymmetric regularization functions and a first vector of regularization parameters.

Statement 5: The methods of statement 4, wherein solving the second inverse problem comprises one or more asymmetric regularization functions and a second vector of regularization parameters.

Statement 6: The method of statement 5, wherein the asymmetric regularization functions comprise a step function, a sigmoid function, or a rectified linear function.

Statement 7: The methods of statements 5 or 6, further comprising computing indicators for mirroring among the second sets of estimated tubular parameters wherein the first set of estimated tubular parameters is used as a baseline reference and comparing the indicators for mirroring to adjustable threshold and iteratively adjusting the regularization parameters vector to find a minimum-norm regularization parameters vector subject to the adjustable threshold.

Statement 8: The methods of statement 7, wherein the minimum-norm regularization parameters vector comprises scaling coefficients that determine a strength of regularization applied to the respective tubular parameters.

Statement 9: The methods of statement 7 or 8, wherein using the second set of estimated tubular parameters comprises the minimum-norm regularization parameters vector.

Statement 10: The method of statement 7-9, wherein the minimum-norm regularization parameters vector is an L2-norm defined as a square root of a sum of squares of each value within the minimum-norm regularization parameters vector, or an L1-norm defined as the sum of absolute values of each value within the minimum-norm regularization parameters vector.

Statement 11: The method of statements 7-10, wherein the indicators for mirroring are at least partially determined from a cross-correlation, cross-covariance, or correlation coefficient.

Statement 12: The method of statements 2-11, wherein the first inverse problem and second inverse problem each comprise searching for tubular parameters that minimize a misfit between the plurality of measurements and a synthetic response computed using a physical model Statement 13: The system of statement 12, wherein the tubular parameters comprise individual thickness of each tubular, percentage metal loss or gain of each tubular, individual magnetic permeability of each tubular, individual electrical conductivity of each tubular, total thickness of each tubular, eccentricity of each tubular, and inner diameter of each tubular.

Statement 14: An electromagnetic (EM) logging tool comprising a transmitter disposed on the EM logging tool configured to transmit an EM from the transmitter into one or more tubulars to energize the one or more tubulars with the EM field thereby producing an eddy current in the one or more tubulars, and a receiver disposed on the EM logging tool configured to measure the EM field generated by the eddy current in the tubulars with the receiver on at least one channel to obtain a plurality of measurements. The EM logging tool may further comprise an information handling system configured to: form a measurement log from the plurality of measurements, solve a first inverse problem to obtain a first set of estimated tubular parameters, solve a second inverse problem with the first set of estimated tubular parameters to obtain a second set of estimated tubular parameters, and determine a final tubular thickness of the one or more tubulars with at least the second set of estimated tubular parameters.

Statement 15: The electromagnetic (EM) logging tool of statement 14, wherein the information handling system is configured to design a data-driven prior based at least in part on the first set of estimated tubular parameters.

Statement 16: The electromagnetic (EM) logging tool of statements 14 or 15, wherein the first inverse problem comprises asymmetric regularization functions and a first vector of regularization parameters.

Statement 17: The electromagnetic (EM) logging tool of statement 16, wherein solving the second inverse problem comprises asymmetric regularization functions and a second vector of regularization parameters.

Statement 18: The electromagnetic (EM) logging tool of statement 17, wherein the asymmetric regularization functions comprise a step function, a sigmoid function, or a rectified linear function.

Statement 19: The electromagnetic (EM) logging tool of statement 18, wherein the regularization parameters vector comprises scaling coefficients that determine a strength of regularization applied to the respective tubular parameters.

Statement 20: The electromagnetic (EM) logging tool of statements 18 or 19, wherein using the second set of estimated tubular parameters comprises a minimum-norm regularization parameters vector.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
disposing an electromagnetic (EM) logging tool in a wellbore, wherein the EM logging tool comprises:
a transmitter disposed on the EM logging tool; and
a receiver disposed on the EM logging tool;
transmitting an EM field from the transmitter into one or more tubulars to energize the one or more tubulars with the EM field thereby producing an eddy current in the one or more tubulars; measuring the field generated by the eddy current in the tubulars with the receiver on at least one channel to obtain a plurality of measurements;
forming a first inverse problem using one or more measurements of the plurality of measurements;
solving, based on the one or more measurements, the first inverse problem to obtain a first set of estimated tubular parameters;
forming a second inverse problem using the first set of estimated tubular parameters;
solving, based on the first set of estimated tubular parameters, the second inverse problem to obtain a second set of estimated tubular parameters; and
subsequent to solving the second inverse problem, determining a final tubular thickness of the one or more tubulars based on, at least in part:
determining a third set of tubular parameters by computing one or more mirror indicators between the first set of tubular parameters and the second set of tubular parameters.

2. The method of claim 1, further making a decision from a direction of metal loss progression through the one or more tubulars.

3. The method of claim 1, wherein solving the first inverse problem comprises one or more asymmetric regularization functions and a first vector of regularization parameters.

4. The method of claim 3, wherein solving the second inverse problem comprises one or more asymmetric regularization functions and a second vector of regularization parameters.

5. The method of claim 4, wherein the asymmetric regularization functions comprise a step function, a sigmoid function, or a rectified linear function.

6. The method of claim 1, wherein computing the one or more mirror indicators comprises using the first set of estimated tubular parameters is used as a baseline reference and comparing the indicators for mirroring to adjustable threshold and iteratively adjusting the regularization parameters vector to find a minimum-norm regularization parameters vector subject to the adjustable threshold.

7. The method of claim 6, wherein the minimum-norm regularization parameters vector comprises scaling coefficients that determine a strength of regularization applied to the respective tubular parameters.

8. The method of claim 6, wherein using the second set of estimated tubular parameters comprises the minimum-norm regularization parameters vector.

9. The method of claim 6, wherein the minimum-norm regularization parameters vector is an L2-norm defined as a square root of a sum of squares of each value within the minimum-norm regularization parameters vector, or an L1-norm defined as the sum of absolute values of each value within the minimum-norm regularization parameters vector.

10. The method of claim 6, wherein the indicators for mirroring are at least partially determined from a cross-correlation, cross-covariance, or correlation coefficient.

11. The method of claim 1, wherein the first inverse problem and second inverse problem each comprise searching for tubular parameters that minimize a misfit between the plurality of measurements and a synthetic response computed using a physical model.

12. The method of claim 11, wherein the tubular parameters comprise individual thickness of each tubular, percentage metal loss or gain of each tubular, individual magnetic permeability of each tubular, individual electrical conductivity of each tubular, total thickness of each tubular, eccentricity of each tubular, and inner diameter of each tubular.

13. The method of claim 1, wherein determining a final tubular thickness of the one or more tubulars with at least the second set of estimated tubular parameters is based on, at least in part, determining one or more optimal regularization parameters for the third set of tubular parameters.

14. An electromagnetic (EM) logging tool comprising:
a transmitter disposed on the EM logging tool configured to transmit an EM from the transmitter into one or more tubulars to energize the one or more tubulars with the EM field thereby producing an eddy current in the one or more tubulars;
a receiver disposed on the EM logging tool configured to measure the EM field generated by the eddy current in the tubulars with the receiver on at least one channel to obtain a plurality of measurements; and
an information handling system configured to:
form a first inverse problem using one or more measurements of the plurality of measurements;
solve, based on the one or more measurements, the first inverse problem to obtain a first set of estimated tubular parameters;
form a second inverse problem using the first set of estimated tubular parameters;
solve, based on the first set of estimated tubular parameters, the second inverse problem to obtain a second set of estimated tubular parameters; and
subsequent to solving the second inverse problem, determine a final tubular thickness of the one or more tubulars based on, at least in part:
determining a third set of tubular parameters by computing one or more mirror indicators between the first set of tubular parameters and the second set of tubular parameters.

15. The EM logging tool of claim 14, wherein the first inverse problem comprises asymmetric regularization functions and a first vector of regularization parameters.

16. The EM logging tool of claim 15, wherein solving the second inverse problem comprises asymmetric regularization functions and a second vector of regularization parameters.

17. The EM logging tool of claim 16, wherein the asymmetric regularization functions comprise a step function, a sigmoid function, or a rectified linear function.

18. The EM logging tool of claim 17, wherein the regularization parameters vector comprises scaling coefficients that determine a strength of regularization applied to the respective tubular parameters.

19. The EM logging tool of claim 17, wherein using the second set of estimated tubular parameters comprises a minimum-norm regularization parameters vector.

* * * * *